GLENN DAMEWOOD
MILES T. HANCHETT
INVENTORS

GLENN DAMEWOOD
MILES T. HANCHETT
INVENTORS

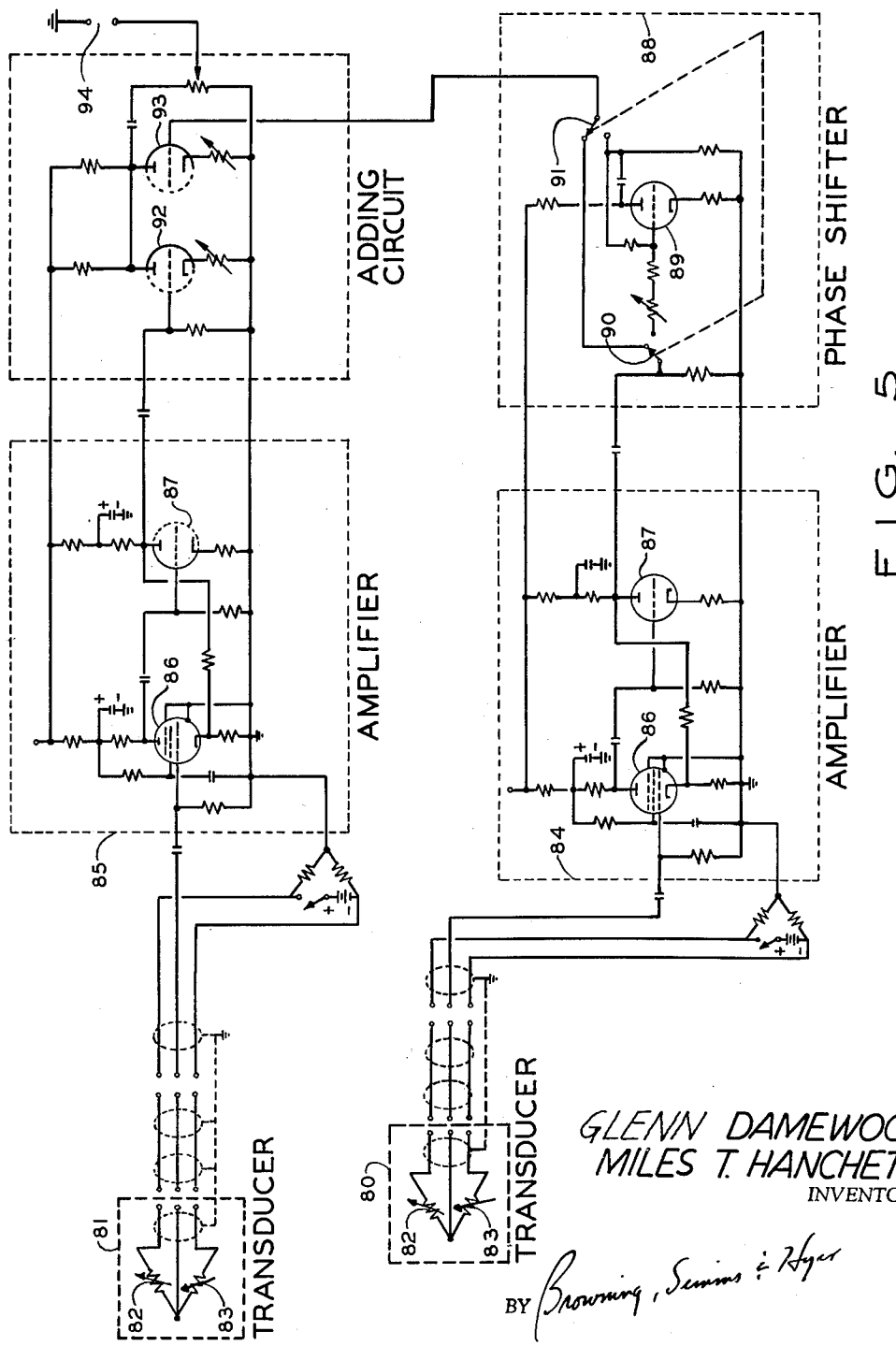

United States Patent Office 2,979,940
Patented Apr. 18, 1961

2,979,940
METHOD FOR MEASURING FORCES WITHIN A SYSTEM

Glenn Damewood and Miles T. Hanchett, San Antonio, Tex., assignors to Southern Gas Association, Dallas, Tex., a corporation of Georgia Filed July 12, 1956, Ser. No. 597,372

5 Claims. (Cl. 73—71.4)

This invention relates to a method for the determination of forces acting on components of a fluid system which may be subjected to acoustic pressure pulsations. In one of its aspects, the invention relates to a method for determining the unbalanced forces resulting from such pulsations acting on a vessel and tending to cause it to mechanically vibrate. In still another aspect, the invention relates to such a method for determining the tension to which such a vessel is subjected by acoustic pressure pulsations acting thereon.

Fluid pumping systems (either gaseous or liquid) are frequently subjected to mechanical vibration arising out of the coupling of acuostic pressure pulsations of the fluid to the system in such a manner as to cause mechanical vibration. In other words, there is a transformation of acoustic energy into mechanical energy with resultant mechanical vibration. To reduce the effect of the acoustic pressure pulsations, acoustic filters are frequently employed in a pulsating fluid stream such as that created by a compressor, an internal combustion engine, a blower, a pump and the like. These filters generally comprise a combination of acoustical capacitances and inductances arranged in a filter network. The capacitances frequently take the form of large diameter pipes or tanks termed "bottles" and the inductances are smaller diameter pipes called "chokes." The filter elements may be connected in series with each other or as a "side branch" of the flow line. In any event, flow through the system including the filters is the result of the pumping action of the pumping device so that it can be said there is imposed upon the steady flow of fluid, an acoustic pressure wave having an amplitude, frequency and wave form dependent primarily upon the nature of the pumping device. In many instances, the pressure wave is of complex wave form. Thus, for a piston-type compressor, the fundamental frequency of the pressure wave generated thereby depends upon the angular velocity of the compressor crank shaft and upon the number and the crank angle spacing of the compressor pistons. In multicylinder compressors where the crank angle interval between the opening of the several suction and discharge valves is not uniform among the cylinders, the wave form can be quite complex. Further, the action of the valve opening and valve closing, the non-linearity of the gas, the non-sinusoidal motion of the compressor pistons, the opposing curvature of the compression and expansion pressure-volume curves, etc., all act to distort the shape of the pressure wave or waves generated by the compressor in the suction and discharge piping. Therefore, in addition to certain fundamental frequencies generated by the compressor, there is also generated all harmonics of the fundamental compressor frequency or frequencies, albeit the amplitude of the higher harmonics may be only a fraction of the fundamental.

Various types of filters have been devised in an effort to discourage or dampen pulsations in the flowing fluids or fluid stream. For example, in copending application Serial No. 514,574, filed June 10, 1955, now Patent No. 2,936,041, there is described a filter in which the bottle and choke lengths, the bottle and choke juncture locations, etc. are preselected not only to reduce the transmission of undesired frequencies but also to reduce vibrations in the filter elements. While the mathematical determination of these various factors in accordance with said application results in a markedly improved filter, it would be highly desirable to possess a method and apparatus which would permit a study of the criticality of these factors and their effect upon the mechanical vibration of the system. In many installations, wide variation of these factors is not permissible due to physical limitations or the like. In such instances, it is necessary to vary only some of the factors and then to determine whether such is sufficient. In other words, the factors are to be varied until mechanical vibration of the system is within permissible limits.

In still other systems, it has been found that mechanical vibration is derived mechanically from a compressor as by unbalance of the crank shaft. Such vibration has frequently been blamed upon unbalanced forces derived from acoustic sources. It would therefore be very desirable to have an apparatus and system which would be capable of isolating the source of the mechanical vibration to determine whether it is derived from acoustic sources or from mechanical sources.

It is, therefore, a general object of this invention to provide a method permitting the determination of the effect of acoustically or mechanically derived forces upon the mechanical elements of a fluid system.

Another object is to provide a method for determining either the balanced or unbalanced forces acting on a system as a result of acoustic pressure pulsations acting on the system even though the acoustic wave form of such pulsations is exceedingly complex.

Another object of the invention is to provide a method for determining the relative phase angles and amplitudes of periodically recurring forces acting in a fluid system and wherein the determination can be for discrete frequencies extending over the entire frequency spectrum of the forces.

Another object of the invention is to provide a method for determining whether the vibration or movement of a fluid system is longitudinal, lateral or pivotal and, in the latter case, to determine the center or pivot point of the movement.

Other objects, advantages and features of this invention will be apparent to one skilled in the art upon a consideration of the written specification, the appended claims and the attached drawings wherein:

Fig. 5 is a detailed wiring diagram of an electrical circuit adapted to be used in the Fig. 1 embodiment.

Like characters of reference will be used throughout the several views.

Figure 1:
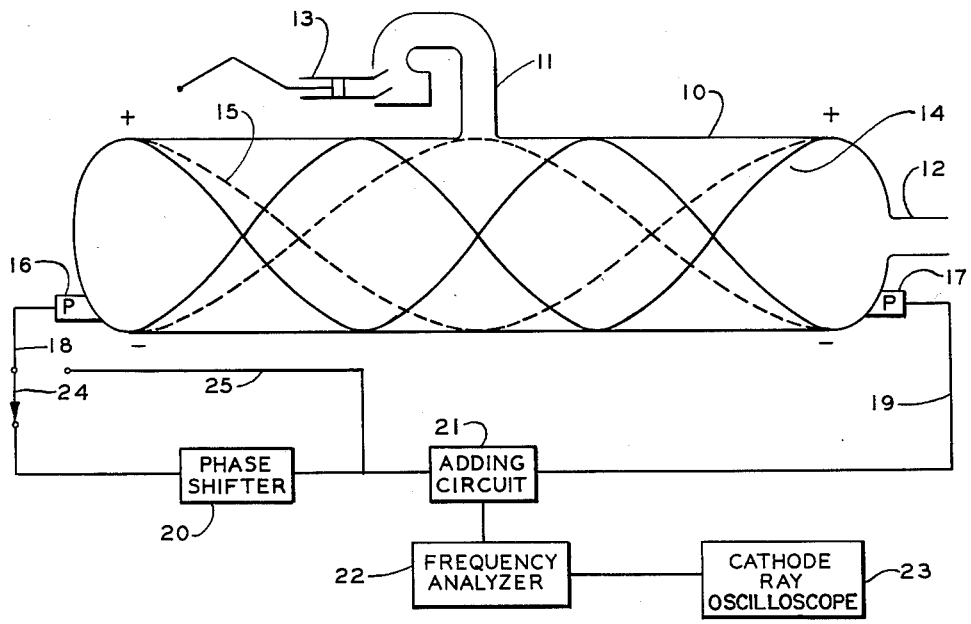
Fig. 1 is a schematic illustration of one embodiment of this invention showing an arrangement for measuring either the balanced or unbalanced forces acting on the ends of a bottle.

Before turning to the drawings, it should be pointed out that it has been found that if pulsations (acoustic energy) are to cause mechanical vibration by coupling from the fluid system, then, within the system, there must exist points where acoustic energy is transformed into mechanical energy. These points may be so situated in the system or a component thereof that forces applied at the points may tend to cause longitudinal vibration, lateral vibration, or even oscillation of the system, the latter being the case where the points are situated so that forces acting at such points tend to form a couple. In any event, mechanical vibration of the system, it has been found, can occur only if the mechanical forces resulting from the transfer of acoustic energy at the points are unbalanced. Stated in another manner, the mechanical vibration can occur only if the vector sum of the mechanical forces at the points of transfer is not equal to zero. In accordance with this invention, these points of transfer are monitored by pick-ups or transducers which generate a signal having an amplitude and phase angle which are a function of the amplitude and phase angle of the acoustic pressure waves acting at such points. The signals from at least two of the pick-ups are then added as vectors by suitable electronic circuitry, for example, to obtain an output which is a function of the unbalanced mechanical forces acting on the system. In such addition, of course, the part of the signal representing the balanced forces acting on the system is canceled out and hence the final output can be said to be a function of the unbalanced mechanical forces acting on the system. When the acoustic pressure wave causing the unbalanced mechanical forces is a complex wave, then the unbalanced mechanical forces will be manifested in the signals at discrete frequencies corresponding to the component frequencies of the complex acoustic pressure wave. The vector addition of the signals from the pick-ups will provide an output signal representative of the unbalanced forces of differing discrete frequencies. This output can be used to determine the amplitude of the unbalanced forces (or of the acoustic pressure waves) at the various frequencies. Thus, the output signal can be fed to an electronic frequency analyzer and the output from this analyzer will consist of the frequency spectrum of the input plus associated amplitudes. From this, the frequency and amplitude of each acoustic pressure wave causing mechanical vibration in the system can be obtained.

Conversely, the invention provides a method which permits a determination of the tension exerted on the components of the fluid system by balanced mechanical forces arising from the action of certain acoustic pressure waves acting on the system.

As another aspect of the invention, a method is provided in which the actual phase relationship and amplitude of the acoustic pressure waves and hence of the mechanical forces can be individually determined for any particular frequency at any number of points in the fluid system. From such a determination, the characteristics of the total unbalanced forces, as well as those of the total balanced forces, acting on the system can be obtained by vector analysis.

Turning now to Fig. 1, there is shown a bottle 10 having a fluid inlet header 11 and an outlet 12. The term "vessel" as used in the specification and claims will be understood to include not only tanks, bottles and the like but any mechanical component containing fluid which may be subject to acoustic pressure pulsations. Fluid, such as gas, can be pumped through bottle as by a compressor 13. The pulsing flow resulting from the action of the compressor can result in standing waves being developed in the bottle where the composite pressure wave generated by the compressor is composed of one or more component pressure waves of appreciable amplitude and having a frequency equal or nearly equal to a resonance frequency of the bottle or other piping. In this connection, it should be pointed out that effective filter design can provide a cut-off frequency below the lowest fundamental frequency generated by the compressor and to effectively dampen pressure waves of many different frequencies. Nevertheless, standing waves of considerable amplitude can still exist in the bottles of the filter and cause serious mechanical vibration.

In Fig. 1, for the sake of illustration, standing waves 14 and 15 have been illustrated. Standing wave 14 has an N value of 3, while standing wave 15 has an N value 2 in the formula $$F = \frac{NV}{2L}$$

wherein F is the frequency, N is an integer, V is the velocity of sound in the fluid and L is the length of the bottle. In this specification, standing waves having odd values of N will be spoken of as odd harmonics and those having even values of N will be spoken of as even harmonics.

From Fig. 1, it will be seen that the odd harmonics have pressure maxima at the ends of the bottle which are out of phase with each other. For the illustration of Fig. 1, the phase difference is 180°. As a result, a pressure maximum will occur at one end of the bottle while pressure minimum occurs at the other. This causes unbalanced forces to develop with resultant mechanical vibration. For the even harmonics, it will be seen that pressure maxima occur simultaneously at opposite ends of the bottle (i.e. in phase) and that pressure minima occur simultaneously. As a result, the even harmonics usually do not tend to cause vibration. The even harmonics result in the balanced forces acting upon the component to place it under a tension.

In accordance with this invention, pressure sensitive transducers or pick-ups 16 and 17 can be provided at spaced apart points in a vessel. As shown in Fig. 1, the pick-ups are at opposing points in the vessel. The pick-ups are sensitive to pressure variations in the vessel at the point where they are situated and generate electrical signals having amplitude and phase angle relationships which are a function of the amplitude and phase angle relationships of the pressure waves acting on the pick-ups from vessel 10. The pick-ups can alternatively be of the type which are sensitive to mechanical vibration to generate signals having amplitude and phase angle relationships which are a function of the amplitude and phase angle relationships of the mechanical forces acting to cause the vibration. Where such vibration is caused by acoustic pressure waves, it will be seen that even with vibration-sensitive pick-ups, the output signals will be a function of the acoustic pressure wave characteristics. The pick-ups can be of the strain gauge type, the quartz crystal type, variable reluctance or variable capacitance type or other types. Pick-ups or transducers suitable for this use are well known to the art so that further description is not warranted.

With the pick-ups arranged as above noted, the signals in conductors 18 and 19 will contain components which are representative of both the in-phase even harmonic pressure waves and the out-of-phase odd harmonic acoustic pressure waves. When it is desired to measure the unbalanced forces, the signal from one of the pick-ups, such as 16, is passed to a phase shifter 20 where the phase of the signal is shifted 180 degrees. The output from the phase shifter and that from pick-up 17 is then fed into an adding circuit 21 where the two signals are algebraically added. In such addition, the in-phase frequencies as existed in conductors 18 and 19 cancel each other out while the out-of-phase frequencies are algebraically added to provide an output which is fed to frequency analyzer 22. The frequency analyzer separates the complex wave form resulting from the addition in adding circuit 21 into its component frequencies. It can also indicate the relative amplitude of each component frequency. If desired, the frequency analyzer can be used to merely separate the complex input wave form into its component frequencies, which are then fed to a cathode ray oscilloscope 23 where the amplitude of the various component frequencies can be measured.

As indicated above, the method and apparatus is also susceptible of determining the balanced forces, and hence the tension applied to a component of the fluid system. As shown in Fig. 1, a switch means 24 and shunt connection 25 are provided to render phase shifter 20 ineffective. Then, the adding circuit will algebraically add the in-phase frequencies while the out-of-phase frequencies will tend to cancel each other out. As a result, the output from the frequency analyzer will be representative of the forces developed by acoustic waves in bottle 10 tending to place the bottle in tension.

From the foregoing, it can be seen that phase shifter 20 and adding circuit 21 together constitute a circuit for vectorially adding the signals from the various pickups.

Figure 2:
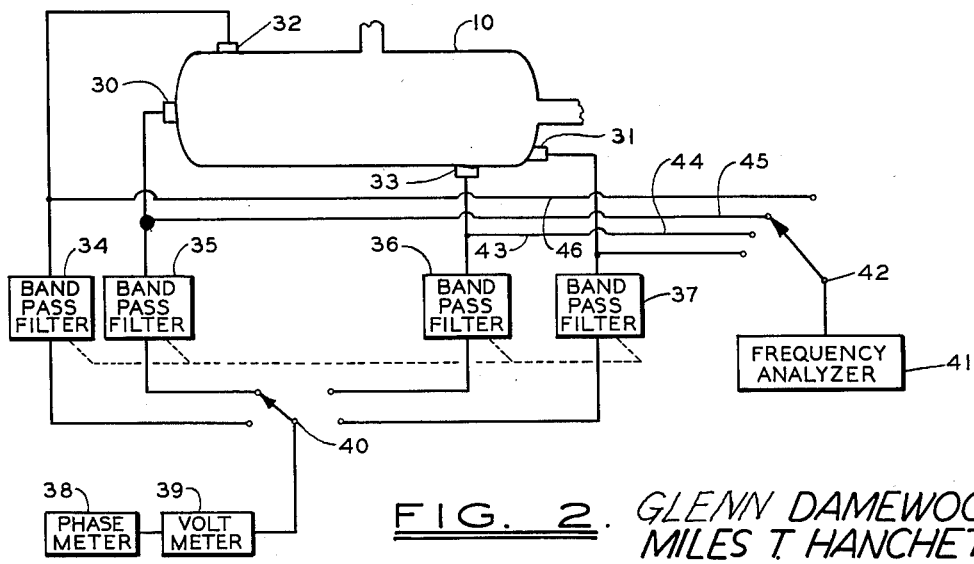
Fig. 2 is a view similar to Fig. 1 except showing an alternative embodiment which is possibly of somewhat more universal application than that of Fig. 1.

In Fig. 2 there is illustrated an embodiment of this invention which can be termed a universal system in that the actual phase relationship and amplitude of the forces acting on a component of a fluid system can be individually determined at any particular frequency and at any desired one of a number of pick-up points. Thus, pick-ups 30 and 31 can be provided at the ends of vessel 10 to determine forces acting on the ends. Also, pick-ups 32 and 33 can be provided adjacent the ends of the vessel but on opposite sides thereof in order to determine the magnitude of any turning moment acting on the vessel. These pick-ups are of the same nature as pick-ups 16 and 17 described above. Their output signal is individually fed into band pass filters 34, 35, 36 and 37. These band pass filters are constructed so that they discriminate against all but a narrow band of frequencies, the band being narrow enough to permit an individual study of each harmonic existing in vessel 10. The filters can be ganged as indicated so that they can be simultaneously adjusted to pass the desired frequency.

A phase meter 38 or other suitable means for determining the relative phase angle relationships of the various signals is also provided. Similarly a voltmeter 39 or other amplitude measuring device is connected in circuit with the phase meter in order to determine the amplitude of the signal at the frequency passed by the filters. Switch means 40 can be provided in the circuit in order to selectively connect the phase meter and volt meter to receive the output from one of the filters.

With this arrangement, the pick-ups on vessel 10 will each generate a signal having a wave form which is a function of the acoustic wave form acting on the pick-ups and hence on the vessel at the point where the pick-ups are situated. These signals will usually be comprised of many component frequencies and the band pass filter can selectively permit a chosen frequency to be passed to the phase meter and voltmeter for determination of the amplitude and phase angle relationships at that frequency. By operating switch means 40, the phase angle and amplitude of the signals from all of the pick-ups can be selectively determined at any particular frequency. With this information, it is possible to add vectorially the amplitude of the forces acting at pick-ups 30 and 31 to obtain their net effect on the vessel. This can be done for each troublesome frequency and a plot made of amplitude versus frequency in order to determine a frequency spectrum of the unbalanced forces acting on the vessel. Similarly, the amplitude and phase angle of the forces acting at the vessel adjacent pick-ups 32 and 33 can be used to determine any turning moment or couple acting on the vessel.

In order to rapidly determine the frequency of the component of acoustic wave which is exerting a substantial effect on vessel 10, a frequency analyzer 41, which indicates the amplitude of the various frequencies making up the entire frequency spectrum, can be provided in combination with a switch means 42. The latter selectively connects the analyzer with one of conductors 43, 44, 45 or 46, which individually are connected with the pick-ups.

Figure 3:
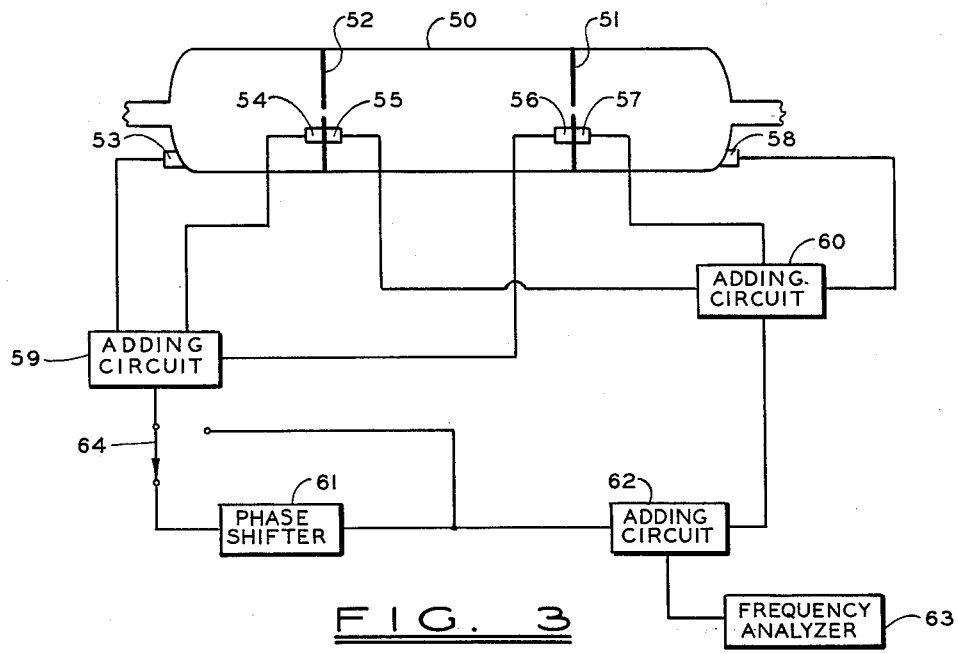
Fig. 3 illustrates another embodiment similar to that of Fig. 1 except that the forces are measured at a plurality of points in the fluid system to obtain the overall summation thereof.

Referring now to Fig. 3, there is illustrated a bottle 50 having baffles 51 and 52 therein. A plurality of pick-ups 53—58 are situated at the ends of the vessel and on opposite sides of the baffles. The signals from pick-ups 53, 54 and 56 will represent forces acting on the bottle in one direction and are fed into an adding circuit 59 to obtain their algebraic sum. Similarly, pick-ups 55, 57 and 58 will produce signals representing forces acting in an opposite direction and these too are fed into an adding circuit 60 to obtain their algebraic sum. The output from one of the adding circuits, such as 59, can then be fed to a phase shifter 61 where the phase is shifted about 180°. Adding circuit 62 is connected with phase shifter 61 and adding circuit 60 so to algebraically add the signals from these two sources. Frequency analyzer 63 is connected to the adding circuit and provides a means for measuring the amplitude of the various discrete frequencies making up the output signal from adding circuit 62.

With this arrangement, it will be seen that means are provided for adding all of the forces exerted by acoustic pressure waves in one direction on vessel 50 along with a means for adding all of such forces acting in the other direction. Then by shifting the phase of the sum of the forces acting in one direction, and adding the phase-shifted signal to the sum of the signals representing the forces acting in the other direction, there is obtained a signal which represents the total unbalanced forces acting on vessel 50. This total will include the forces acting on the ends of the vessel as well as on opposite sides of baffles 51 and 52.

Similarly to Fig. 1, switch 64 can be provided to by-pass phase shifter 61 in order to determine the tension of vessel 50 arising from forces acting thereon.

Figure 4:
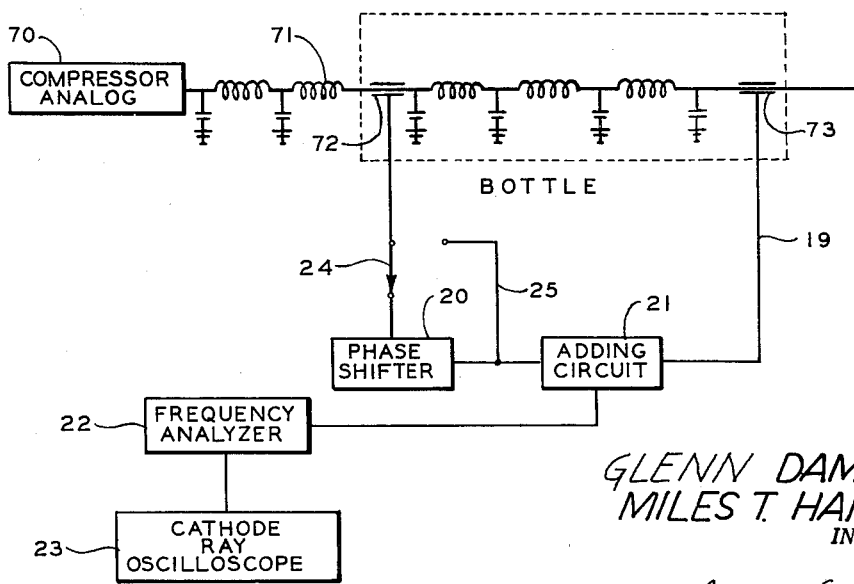
Fig. 4 shows another embodiment of the invention as applied to an analog of a fluid system rather than to the fluid system itself as shown in Fig. 1.

In copending application Serial No. 512,262, filed May 31, 1955, there is described an analog for electrically simulating the action of a compressor and its effect on a gas transmission system. The method and apparatus of this invention is adapted for use with an analog of this type and other types as well as with the actual fluid systems described above. Thus, referring to Fig. 4, the compressor analog is indicated by the numeral 70 and its discharge or suction flow system by the numeral 71. As will be seen, this flow system comprises a combination of inductances and capacitances hooked in pi-section so as to constitute an electrical delay line simulating the flow of fluid through a conduit. By suitable sizing of the inductances and capacitances, the flow through a bottle can also be simulated. This is indicated by the portion of the delay line within the box labeled "Bottle" in Fig. 4. In any event, pick-ups 72 and 73 can be electrically connected with the delay line at points which simulate their desired position in an actual bottle or other component of the fluid system. These pick-ups will be sensitive to the parameter of the delay line which represents pressure, such as voltage. In any event, their signal outputs will simulate the signal outputs of the pick-ups in an actual system as illustrated above with respect to Figs. 1 to 3. The remainder of the circuit in Fig. 4 has been laid out to substantially duplicate that of Fig. 1 and hence will need no further description.

It will be noted that the circuit arrangement of Figs. 2 and 3, as well as other variants thereof, can be used in conjunction with flow system analogs simply by making the transducers sensitive to the one of voltage, current flow, etc., representing the pressure parameter in the analog.

The electrical components of the above-described circuits, such as the adding circuits, phase shifters, etc., can individually comprise any number of forms known to those skilled in the art. A typical circuit is illustrated in Fig. 5. Referring to that figure, transducers 80 and 81 are shown in one form they can take for use with the system of Fig. 1, for example. Thus the transducers can comprise strain gauges in the form of longitudinally wound coils 82 and circumferentially wound coils 83 each of which has its resistance varied as a function of changes in pressure. These coils function as a part of a bridge to generate a signal to be fed to amplifiers 84 and 85. These signals are, of course, of an amplitude and phase relationship which are a function of the voltage (or current, etc.) waves in the delay line. Of course, where the circuit is to be used with an analog, the pick-ups will be made sensitive to the parameter corresponding to pressure. For the analog of Fig. 4, a direct connection with the delay line can be used so that the pick-up comprises a conductor only.

Each of the amplifiers 84 and 85 comprise two stages as represented by vacuum tubes 86 and 87. Amplifier 84 is capacitance coupled to a phase shifter 88 which can comprise a single tube vacuum tube 89 having a gain of one. The output signal from amplifier 84 will thus be shifted in phase 180° without any change of amplitude. It will be noted that ganged switches 90 and 91 are provided in the circuit to shunt the phase shifting tube 89 for the purposes above described. The output of phase shifter 88 and amplifier 85 is fed into tubes 92 and 93, which are connected to form an adding circuit as shown. The output from this adding circuit can then be sent to a frequency analyzer or other circuitry not shown. It is intended that the circuit of Fig. 5 is for illustrative purposes only and obviously those skilled in the art can vary it considerably within the scope of this invention.

As an alternate to the method above disclosed, it is contemplated that a dual channel recorder oscilloscope can be connected by conventional circuitry to pick-ups so that the complex wave form of the signal output from each pick-up can be recorded. Then, by Fourier analysis, the complex waves thus recorded can be separately broken down into their components. The components of the complex waves can then be matched as to their frequency and vectorially added to arrive at the frequencies which cancel each other out and also the amount of unbalance caused by the out-of-phase frequencies. If desired, the components thus separated by the analysis from each end of the bottle, for example, can be combined into a complex wave representing the unbalanced condition caused by the acoustic pressure waves acting on the bottle. It is preferred, however, to first combine the signals as above described to obtain the complex wave form of the unbalanced or balanced pressure, as the case may be. This wave form can then be broken down into its components by Fourier analysis to determine the particular frequencies having the most effect on the system.

With the foregoing method and apparatus, it is possible to determine whether mechanical vibration in a system is being caused by acoustic forces, or by mechanical forces, or both. Thus, mechanical vibration can be caused in part or wholly by an unbalanced crank shaft. One way of separating the vibrations of a system caused by transfer of acoustic energy from those caused by mechanical excitation involves the use, for example, of both vibration and pressure sensitive pick-ups on the system. The signals from the vibration sensitive pick-ups are vectorially added together as are the signals from the pressure sensitive pick-ups. Then, for any particular frequency, the amplitude of vibration produced by acoustic forces can be subtracted from that of the combined vibration signals to yield a difference which will be representative of the amount of vibration caused by mechanical excitation. The amplitude of the combined pressure signals will, of course, be a function of the amount of vibration caused by acoustic forces.

On the other hand, a vibration sensitive pick-up can be connected to the compressor and by comparing its amplitude at various frequencies with the amplitude of the combined pressure signals at corresponding frequencies, it can be determined if the mechanical vibration of the system is caused at least in part by mechanical excitation.

Also, the method and apparatus permits a study to be made of the effect on vibration of changing the location of the junctures of nozzles, chokes, etc., with a bottle as well as the effect of bottle and choke sizes on vibration. It is thus possible to determine whether a change in nozzle or choke location, for example, would increase or decrease the mechanical vibration of a system. Frequently such knowledge may be of considerable value. For example, existing filter systems may be subject to mechanical vibration. Space limitations or the like may not permit a change in bottle size to reduce the vibrations. However, with a knowledge of the amplitude and frequency of the troublesome pressure waves, a change in nozzle or choke juncture with the bottle may permit a satisfactory reduction in vibration.

While reference has been made above to the proposition that the odd harmonics cause vibration whereas even harmonics do not, there are exceptions to this general rule. For example, if a choke tube extends a substantial distance into one end of a bottle or if its diameter is a substantial portion of the bottle's diameter, then the even harmonics will contribute to mechanical vibration although perhaps not as much as the odd harmonics. In any event, the system of Fig. 2 can be used to determine the effect of the even harmonics as well as the odd harmonics and this emphasizes its versatility.

When it is said that the electrical signals generated by the pick-ups have an amplitude and phase angle relationship which is a function of the amplitude and phase angle relationship of either the acoustic pressure wave or the varying mechanical force to which the pick-ups are sensitive, it will be understood that the signals will have wave forms substantially duplicating the wave forms of the acoustic wave or mechanical force. The phase differences between peaks or other points on the wave forms will be the same in both the signal and the acoustic or force wave. The amplitude of the signal need only be proportional to that of the acoustic or force wave, it being important only that the relative peak amplitudes not be distorted in the signal.

While reference has been made to an analog which electrically simulates the action of a compressor on a fluid system, this invention can also be used with a mechanical analog using a spring-mass system. In such system, displacement could be analogous to pressure and suitable pick-ups could be employed to be sensitive to the displacement and thereby provide signals for use as above described.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method for measuring forces resulting from acoustic pressure waves acting on a vessel containing a gaseous fluid stream flowing through the vessel, said stream having a pulsating flow created by a fluid pumping device generating in said stream acoustic pressure waves of complex harmonic structure, comprising the steps of sensing the effect of said waves on said vessel at spaced apart opposing points where the acoustic energy of said stream tends to be converted to mechanical energy in said vessel, generating at least two signals having an amplitude and phase angle which are a function of the amplitude and phase angle of said pressure waves as they exist at said points, adding said signals to obtain an output representing the effect of said pressure waves on said vessel at said points and recording said output.

2. A method for measuring forces resulting from acoustic pressure waves acting on a vessel containing a gaseous fluid stream flowing through the vessel, said stream having a pulsating flow created by a fluid pumping device generating in said stream acoustic pressure waves of complex harmonic structure, comprising the steps of sensing the effect of said waves on said vessel at spaced apart opposing points where the acoustic energy of said stream tends to be converted to mechanical energy in said vessel, generating at least two signals having an amplitude and phase angle which are a function of the amplitude and phase angle of said pressure waves as they exist at said points, shifting the phase of one signal from one point about 180°, and then algebraically adding the thus phase-shifted signal with that from an opposing point to obtain an output which represents the net unbalanced force acting on said vessel at said points.

3. A method for measuring forces resulting from acoustic pressure waves acting on a vessel containing a gaseous fluid stream flowing through the vessel, said stream having a pulsating flow created by a fluid pumping device generating in said stream acoustic pressure waves of complex harmonic structure, comprising the steps of sensing the effect of said waves on said vessel at spaced apart opposing points where the acoustic energy of said stream tends to be converted to mechanical energy in said vessel, generating at least two signals having an amplitude and phase angle which are a function of the amplitude and phase angle of said pressure waves as they exist at said points and algebraically adding the signal from at least two of said opposing points to obtain an output which represents the forces acting to place the vessel in tension.

4. A method for measuring forces resulting from acoustic pressure waves acting on a vessel containing a gaseous fluid stream flowing through the vessel, said stream having a pulsating flow created by a fluid pumping device generating in said stream acoustic pressure waves of complex harmonic structure, comprising the steps of sensing the effect of said waves on said vessel at spaced apart opposing points where the acoustic energy of said stream tends to be converted to mechanical energy in said vessel, generating at least two signals having an amplitude and phase angle which are a function of the amplitude and phase angle of said pressure waves as they exist at said points, algebraically adding the signal from at least two of said opposing points to obtain an output which represents the forces acting to place the vessel in tension, resolving said output into different discrete frequencies and determining the amplitude of at least one of the discrete frequencies so resolved.

5. A method for measuring forces resulting from acoustic pressure waves acting on a vessel containing a gaseous fluid stream flowing through the vessel, said stream having a pulsating flow created by a fluid pumping device generating in said stream acoustic pressure waves of complex harmonic structure, comprising the steps of sensing the effect of said waves on said vessel at spaced apart opposing points where the acoustic energy of said stream tends to be converted to mechanical energy in said vessel, generating at least two signals having an amplitude and phase angle which are a function of the amplitude and phase angle of said pressure waves as they exist at said points, attenuating the frequencies comprising said signals to either side of a selected range of frequencies and measuring the amplitude of frequencies within said pre-selected range.

References Cited in the file of this patent

UNITED STATES PATENTS

| 2,362,467 | Clark | Nov. 14, 1944 |
| 2,365,218 | Rogers | Dec. 19, 1944 |
| 2,604,781 | Bechtold | July 29, 1952 |

FOREIGN PATENTS

| 553,120 | Great Britain | May 7, 1943 |
| 657,115 | Great Britain | Sept. 12, 1951 |

OTHER REFERENCES

Periodical, The Oil and Gas Journal, March 8, 1954, pp. 101, 102, 105, 112.